United States Patent
Ju

(10) Patent No.: US 6,768,601 B2
(45) Date of Patent: Jul. 27, 2004

(54) POSITION CONTROL UNIT FOR LENS OF OPTICAL PICKUP DEVICE

(75) Inventor: Chae Min Ju, Pyeongtaek (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/247,540

(22) Filed: Sep. 20, 2002

(65) Prior Publication Data

US 2003/0058550 A1 Mar. 27, 2003

(30) Foreign Application Priority Data

Sep. 21, 2001 (KR) .................................. 10-2001-58754

(51) Int. Cl.[7] .............................. G02B 7/02; G11B 7/00
(52) U.S. Cl. .................... 359/824; 359/814; 369/44.14; 369/44.15
(58) Field of Search ................................ 359/811, 814, 359/819, 820, 824; 369/44.14, 44.15

(56) References Cited

U.S. PATENT DOCUMENTS 6,344,936 B1 * 2/2002 Santo et al. ................ 359/824
6,532,118 B2 * 3/2003 Ohno ........................ 359/824
2003/0234990 A1 * 12/2003 Akanuma ................... 359/819

* cited by examiner

Primary Examiner—Hung Xuan Dang
Assistant Examiner—Joseph Martinez
(74) Attorney, Agent, or Firm—Birch, Stewart, Kolasch & Birch, LLP

(57) ABSTRACT

A lens position control unit of an optical pickup device, which is able to reduce the overall size of the device, to reduce the weight of the device, and to simplify the fabrication process by patterning coils for focusing, tracking, and radial tilt driving of a lens on a printed circuit board (PCB), comprises: a lens holder, on which a lens is fixed, disposed on upper part of a suspended yoke plate; suspension wires for supporting the suspension of the lens holder and applying electric power; coil PCBs, on which coils for focusing, tracking, and radial tilt driving of the lens holder are patterned, attached on front and rear parts of the lens holder; and magnets positioned at predetermined intervals from the coil PCBs to drive the lens by interaction with the coil PCBs.

15 Claims, 3 Drawing Sheets

POSITION CONTROL UNIT FOR LENS OF OPTICAL PICKUP DEVICE

This nonprovisional application claims priority under 35 U.S.C. §119(a) on Patent Application No. 2001-0058754 filed in Korea on Sep. 21, 2001, which is herein incorporated by reference.

BACKGROUND OF THE INVENTION

1. Field of the Invention

The present invention relates to a unit for controlling lens position in an optical pick-up device, and particularly, to a position control unit for lens of an optical pick-up device which is able to simplify the fabrication process and reduce the size and weight thereof by patterning a magnetic driving coil for focusing, tracking, and radial tilt driving of the lens on a printed circuit board (PCB).

2. Description of the Background Art

An optical pickup records and reproduces information such as video or audio data onto/from recording media, e.g., discs (or disks). A disc has a structure such that an information-recording surface is formed on a substrate.

Generally, an optical pickup device is installed on a CD player, etc. to radiate a laser light toward a recording media and to reproduce information recorded on the recording media by receiving light reflected from the recording media. And the optical pickup device comprises a hologram device for irradiating the light toward the recording media and changing the reflected light into an electric signal, a lens for concentrating the laser light irradiated from the hologram device on a disc, and a lens control unit for controlling location of the lens in order to compensate an error in case that an error is generated in the focus of laser light concentrated on the disc.

FIG. 1 is a perspective view showing a lens location control unit in an optical pickup device according to the conventional art, and FIG. 2 is a cross-sectional view showing a lens position control unit in the optical pickup device according to the conventional art.

In the lens position control unit in the conventional optical pickup device, a lens holder 106 on which a lens 104 is fixed is disposed on an upper surface of a suspended yoke plate 102, and suspension wires 108 are connected between the yoke plate 102 and the lens holder 106 to support the suspension of the lens holder 106.

The lens holder 106 includes a lens 104 fixed on a center part thereof, a focusing coil 110 for focusing/driving the lens holder 106 wound on an outer side thereof in a circumferential direction, and tracking coils 112 having (rough square shapes) for tracking/driving the lens holder 106 attached on front and rear surfaces thereof.

In addition, coil PCBs 114, to which the focusing coil 110 and the tracking coil 112 are electrically connected, are disposed on left and right side surfaces of the lens holder 106, and a plurality of suspension wires 108 are attached to the coil PCBs 114. Herein, two suspension wires 108 are respectively connected to each of the coil PCBs 114 to transmit a signal of a servo system to the focusing coil 110 and to the tracking coil 112, to support the lens holder 106 elastically, and to attenuate the shock from outer side from being transmitted to the lens holder 106.

Inner yoke 116 and an outer yoke 118 are disposed on front and rear side surfaces of the yoke plate 102 and facing each other with a predetermined interval therebetween. In addition, magnet 120 is attached to the outer yoke 118, and the focusing coil 110, and the tracking coil 112 are positioned between the inner yoke 116 and the outer yoke 118.

In addition, a yoke 124 for fixing a suspension PCB 122 which is connected to the suspension wire 108 is disposed on one side of the yoke plate 102 in a vertical direction, and a gel holder 128 in which damping gel 126 (having a high viscosity) is injected, is installed on the yoke 124 in order to attenuate vibrations of the suspension wires 108.

The suspension PCB 122 is connected to the PCB (not shown) of the main body through a flexible PCB or through a cable.

That is, the lens holder 106 having the lens 104 is lifted while maintaining a predetermined interval with the magnet 120 (which is attached to the outer yoke 118) by the elastic force of the suspension wires 108.

Operation of the lens position control unit in the conventional optical pickup device is described as follows:

When electric power is applied to the focusing coil 108 through the suspension wires 108 during the focusing/driving of the lens, the lens holder 106 is moved in a focusing direction, that is, in up-and-down direction to control the focus of a beam on an information-recording surface of the disc by an interaction between the focusing coil 110 and the flux generated on by the magnets 120. In addition, when electric power is applied to the tracking coil 112 through the suspension wires 108 during the tracking/driving of the lens, the lens holder 106 is moved in the tracking direction, that is, in left-and-right directions to control tracking of the beam on an information-recording surface of the disc by an interaction between the tracking coil 112 and flux generated by the magnet 120.

The conventional optical pickup device is able to reproduce only a particular kind of disc, and therefore, the need for an optical pickup device for a complex disc drive which is able to reproduce a disc for DVD and to record and reproduce a disc for CD-RW are developing.

In the optical pickup device of the combo type disc drive, a light source for DVD (650 nm wavelength) and a light source for CD-RW (780 nm wavelength) are used together using one lens.

A lens position control unit in the optical pickup device for the complex disc drive requires a focusing coil for focusing/driving of the lens, a tracking coil for tracking/driving of the lens, and a tilt coil for radial tilt driving of the lens.

That is, the lens position control unit according to the conventional art requires an additional tilt coil for radial tilt driving on the lens holder, and therefore, the size and weight of the optical pickup device is increased and fabrication processes thereof are complex.

Also, respective coils are formed by winding wire of a copper material, and the weight thereof is about one third of the entire weight of the lens position control unit. Therefore, the amount of electric current which is applied to respective coils is increased in order to control the position of the lens control unit, and a responding function is reduced.

SUMMARY OF THE INVENTION

Therefore, an object of the present invention is to provide a lens position control unit for an optical pickup device which is able to reduce the size of entire device, to reduce the weight of the device, and to simplify the fabrication process by patterning coils for focusing, tracking, and radial tilt driving of a lens on a printed circuit board (PCB).

To achieve the object of the present invention, as embodied and broadly described herein, there is provided a lens position control unit for an optical pickup device according to the present invention comprising: a lens holder, on which a lens is fixed, disposed on an upper part of a suspended yoke plate; suspension wires for supporting the suspension of the lens holder and applying electric power; coil PCBs, on which coils for focusing, tracking, and radial tilt driving of the lens holder are patterned, attached on front and rear parts of the lens holder respectively; and magnets positioned apart from the coil PCBs at a predetermined gap for driving the lens by an interaction with the coil PCBs.

The lens holder in the lens position control unit includes a lens on a center part thereof, mounting members to which the suspension wires are fixed on both side surfaces thereof, and a PCB for connecting electric power between the suspension wires and the coil PCB electrically attached thereto.

The PCBs for connecting electric power in the lens position control unit are attached to left and right side surfaces of the lens holder, and have suspension wires connected thereto respectively and electric power connecting patterns which are connected to the front and rear coil PCBs electrically.

Three suspension wires in the lens position control unit are connected to both PCBs for connecting electric power respectively.

The coil PCB of the lens position control unit comprises: a focus pattern for focus driving the lens holder; a tracking pattern for tracking/driving the lens holder; and a tilt pattern for tilt/driving the lens holder on which the lens is mounted toward the radial direction of the disc.

The focus pattern of the lens position control unit is formed to have long width in up-and-down direction on a center part of the coil PCB.

The tracking pattern of the lens position control unit is formed to have long widths in a side direction of the coil PCB on four corners of the coil PCB.

A pair of tilt patterns of the lens position control unit are disposed to face each other in a diagonal direction of the coil PCB edge, and formed to have longer widths in up-and-down direction of the coil PCB.

The tracking pattern and the tilt pattern in the lens position control unit are formed as lamination structures overlapping in a right angle direction with each other, and the tracking pattern is protruded toward the center portion of the coil PCB and the tilt pattern is protruded in up-and-down direction of the coil PCB centering around the overlapped portion.

The magnets in the lens position control unit are fixed inside of an outer core of the yoke plate, and comprise a first magnet which is disposed to face the focusing pattern and the tracking pattern and to interact therewith, and a second magnet which is disposed to face the tilt pattern and to interact with the tilt pattern.

The first magnet of the lens position control unit is disposed to form a North pole and a South pole in up-and-down direction of the coil PCB so as to be located facing the protruded part of the tracking pattern, and thereby the magnetic force can reach to focusing pattern and the tracking pattern.

The second magnet of the lens position control unit is disposed to cross with the first magnet at right angles so as to face the tilt pattern, and is formed to have a North pole and a South pole in left-and-right directions of the coil PCB.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

There may be a plurality of embodiments of the lens position control unit in an optical pickup device according to the present invention, and the most preferred embodiment will be described hereinafter.

Figure 1:
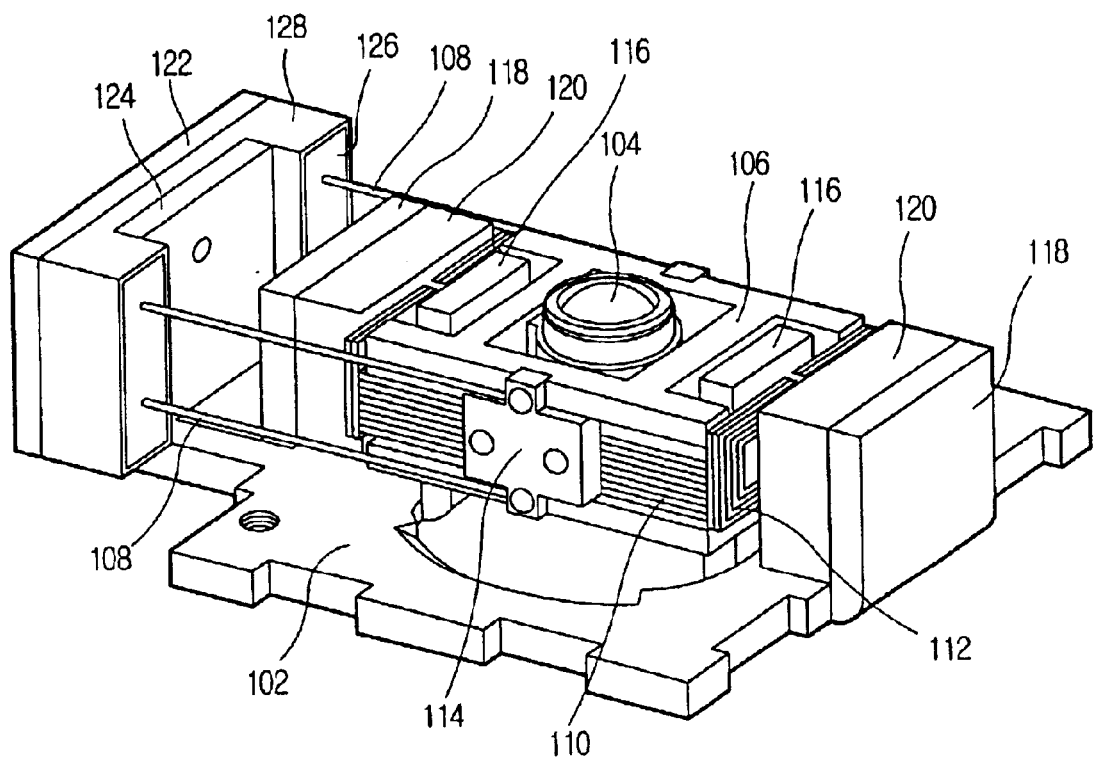
FIG. 1 is a perspective view showing a lens position control unit in an optical pickup device according to the conventional art.
Figure 2:
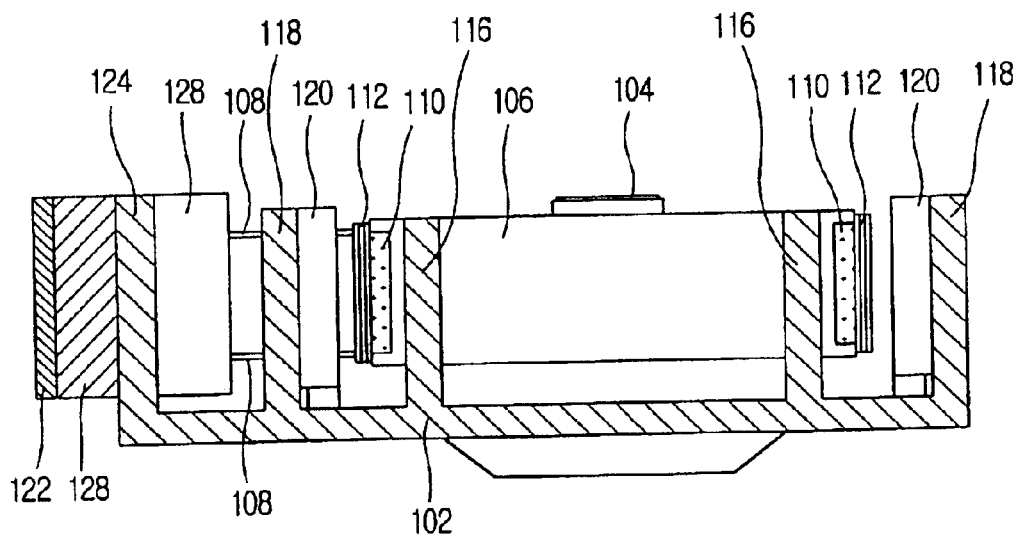
FIG. 2 is a cross-sectional view showing the lens position control unit of the optical pickup device according to the conventional art.
Figure 3:
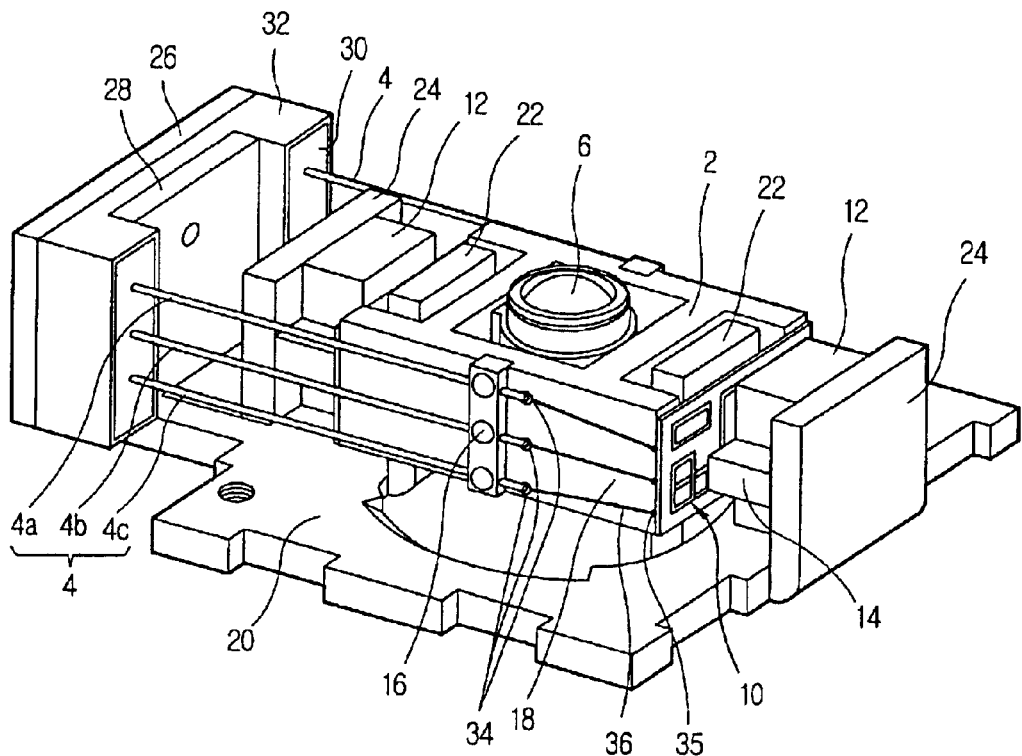
FIG. 3 is a perspective view showing a lens position control unit in an optical pickup device according to the present invention.

FIG. 3 is a perspective view showing the lens position control unit in the optical pickup device according to the present invention.

The lens position control unit according to the present invention comprises: a lens holder 2, on which a lens is fixed, disposed on an upper surface of a suspended yoke plate 20; suspension wires 4 for supporting the suspension of the lens holder 2 and applying electric power; coil PCBs 10, on which coils for focusing, tracking, and radial tilt driving of lens 6 are patterned, attached on front and rear parts of the lens holder 2; and magnets 12 and 14 positioned at predetermined intervals with the coil PCB 10 to drive the lens 6 by an interaction with the coil PCBs 10.

The lens holder 2 in the lens position control unit includes a lens 6 on a center part thereof, mounting members 16 to which the suspension wires 4 are fixed on both side surfaces thereof, and a PCB 18 for connecting electric power which connects the suspension wires 4 and the coil PCBs 10 electrically attached thereto.

The yoke plate 20, on which the lens holder 2 is located (suspended from the upper surface thereof), includes inner yoke 22 and an outer yoke 24 on front and rear side surfaces thereof to face each other with a predetermined interval therebetween. In addition, the magnets 12 and 14 are attached on the inside of the outer yoke 24, and the coil PCB 10 is located between the inner yoke 22 and the outer yoke 24.

In addition, a fixing yoke 28 for fixing a suspension PCB 26 which is connected to the suspension wires 4 are disposed on one side of the yoke plate 20 in a vertical direction, and a gel holder 32 (in which damping gel 30 high viscosity is injected) is installed on the yoke 28 in order to attenuate the vibrations of the suspension wires 4.

Herein, it is desirable that three suspension wires 4 are mounted on respective mounting plates 16 so as to transmit electric power for focusing, tracking, and radial tilt driving of the lens to the coil PCB 10 by being connected between the mounting member 16 and the suspension PCB 26.

Figure 4:
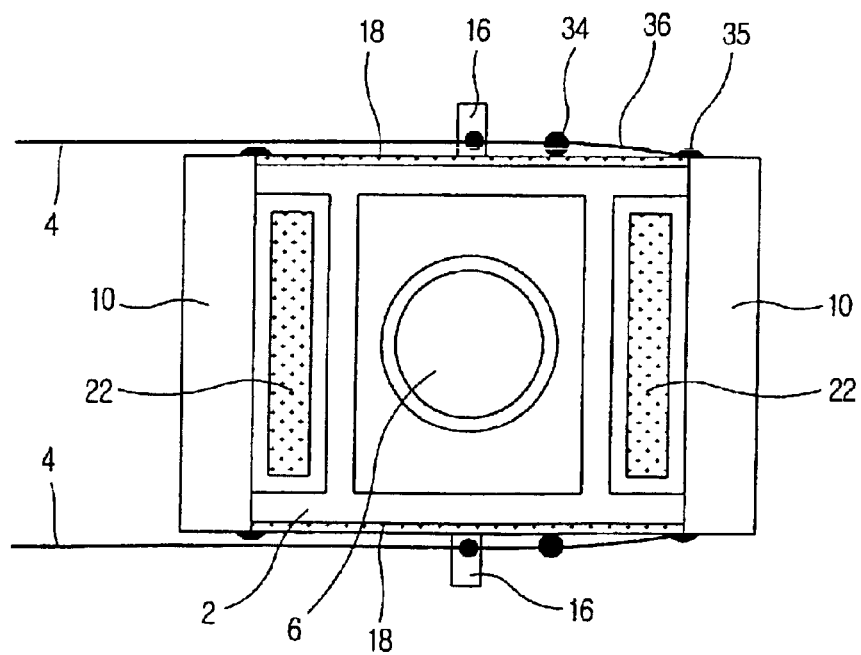
FIG. 4 is a top view showing the lens position control unit of the optical pickup device according to the present invention.
Figure 5:
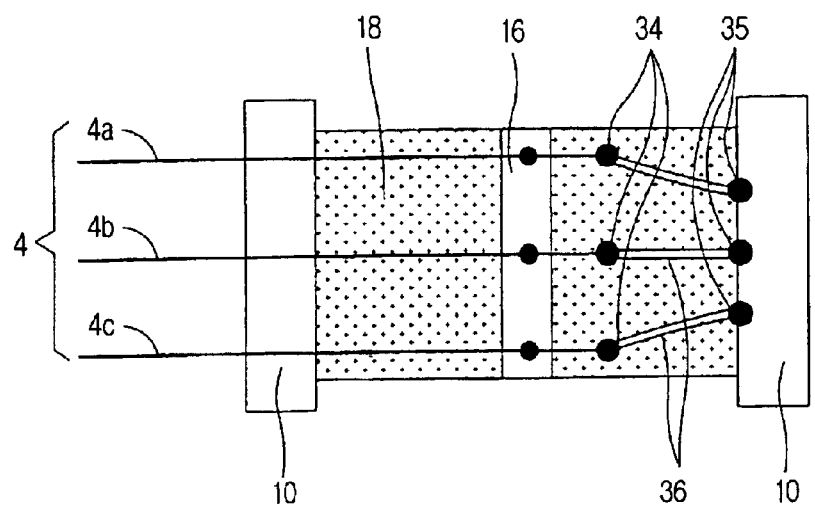
FIG. 5 is a side view showing the lens position control unit of the optical pickup device according to the present invention.

In addition, as shown in FIGS. 4 and 5, the PCB for connecting electric power is to transmit the electric power which is applied to the suspension wires 4 to the coil PCB 10. Also, the PCB for connecting electric power includes connecting points 34 which are attached to left and right side surfaces of the lens holder 2 and connected to end portions of the suspension wires 4 electrically, and includes electric power connecting patterns 36 which are connected electrically with the coil PCBs 10 on front and rear portions. At that time, the electric power connecting patterns 36 are connected to the coil PCBs 10 on connecting points respectively by soldering.

The electric power connecting patterns 36 and the coil PCBs 10 can be connected by using wires. Therefore, the suspension wire 4a on the highest position (see FIG. 5) supplies the electric power to the focusing pattern 40 on the coil PCB 10 (which will be described later), and the suspension wire 4c on the lowest position (shown in FIG. 5) supplies the electric power to the tracking pattern 42 (described later), and the suspension wire 4b shown in an intermediate position supplies electric power to the tilt pattern 44 (also described later), respectively.

The suspension wires 4 on one side surface of the lens holder 2 are electrically connected to the focusing pattern 40, the tracking pattern 42, and the tilt pattern 44 of the coil PCB 10 located on the front side of the lens holder 2. In addition, the suspension wires 4 on the other side of the lens holder 2 are electrically connected to the focusing pattern 40, the tracking pattern 42, and the tilt pattern 44 of the coil PCB 10 located on the rear side of the lens holder 2.

Figure 6:
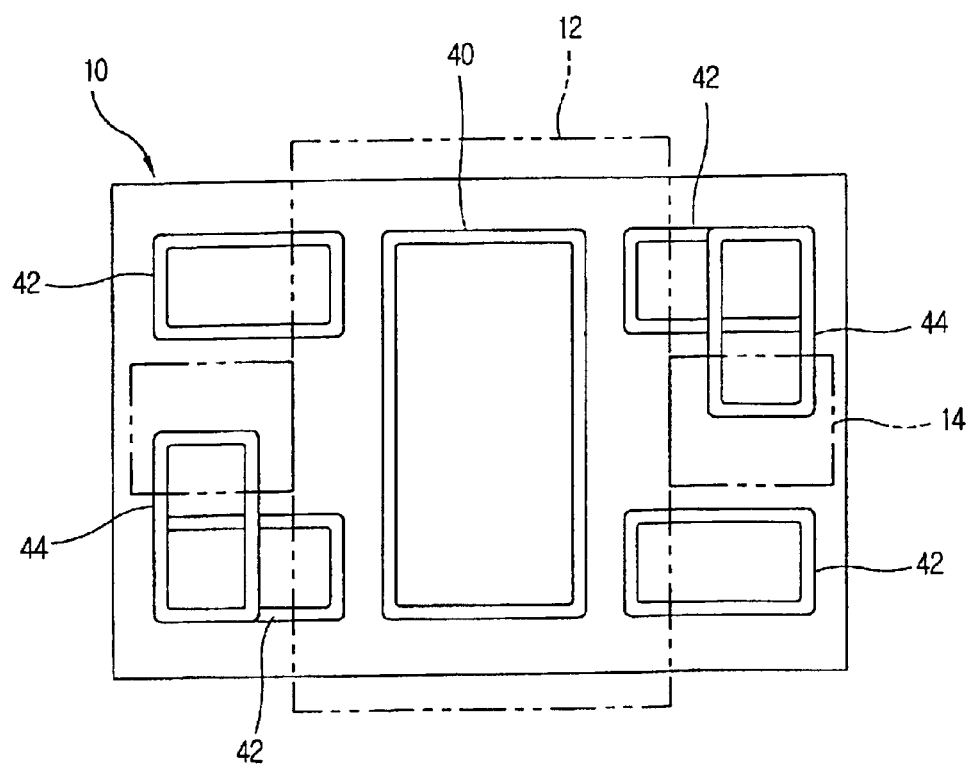
FIG. 6 is a side view showing a coil PCB of the lens position control unit according to the present invention.

As shown in FIG. 6, the coil PCBs 10 are attached to the front and rear side surfaces of the lens holder 2, and includes the focusing pattern 40 for focusing/driving the lens holder 2, the tracking pattern 42 for tracking/driving the lens holder 2, and the tilt pattern 44 for radial tilt driving the lens holder formed on a front surface thereof.

The focusing pattern 40 is formed to be longer in the up-and-down direction on a center part of the coil PCB 10, and two tracking patterns 42 are formed on upper and lower positions on side surface of the focusing pattern 40, that is, four tracking patterns 42 are formed to be long in left and right direction of the coil PCB 10. In addition, a pair of tilt patterns 44 are formed to be opposite in a diagonal direction on an edge portion of the coil PCB 10.

Herein, a part of the tracking pattern 42 and a part of the tilt pattern 44 are overlapped with each other, the tracking pattern 42 is formed to be protruded toward the center of the coil PCB 10 and the tilt pattern 44 is formed to be protruded in up-and-down direction of the coil PCB 10 on the overlapped portion of both parts.

The magnets 12 and 14 are a first magnet 12 interacting with the focusing pattern 40 and with the tracking pattern 42, and a second magnet 14 interacting with the tilt pattern 44.

Herein, the first magnet 12 is formed on a position facing the focusing pattern 40 and the tracking pattern 42 is positioned so as to interact therewith, and disposed to form North pole and South poles in up-and-down direction of the coil PCB 10. In addition, the second magnet 14 is formed to face the tilt pattern 44 so as to interact with the tilt pattern 44, and disposed to form North poles and South poles in a left and right direction of the coil PCB 10.

Therefore, the first magnet 12 and the second magnet 14 are formed to cross North poles and South poles thereof.

Operation of the optical pickup device according to the present invention constructed as above will be described as follows.

When the electric power is applied to the suspension wire 4a on the highest position among those three suspension wires 4 during focus/driving and the electric power is applied to the focusing pattern 40 of the coil PCB 10 along with the electric power connecting pattern 36 of the PCB for connecting electric power 18, the lens holder 2 is moved in an up-and-down direction by the interaction between the electromagnetic force generated on the focusing pattern 40 and the magnetic force generated on the first magnet 12 to control the position of the lens 6, and thereby the focus of the laser light on the information-recording surface of the disc is controlled.

In addition, when the electric power is applied to the tracking pattern 42 through the suspension wire 4c on the lowest position among those three suspension wires 4 during tracking/driving, the lens holder 2 is moved in a left and right direction by the interaction between the electromagnetic force generated on the tracking pattern 42 and the magnetic force generated on the first magnet 12 to control the position of the lens 6, and thereby the position of laser which is formed on a signal track of the information-recording surface of the disc is controlled.

In addition, when the electric power is applied to the tilt pattern 44 through the suspension wire 4b on the intermediate position among the three suspension wires 4 during radial tilt driving, the lens holder 2 is moved by the interaction between the electromagnetic force generated on the tilt pattern 44 and the magnetic force generated on the second magnet 14 to control the radial tilt of the lens 6.

That is, the direction of electric power is applied to the tilt pattern 44 of the coil PCB 10 which is located on the front surface of the lens holder 2 so as to move the lens holder 2 downward, and the direction of electric power is applied to the tilt pattern 44 of the coil PCB 10 located on the rear portion of the lens holder 2 so as to move the lens holder upward. The lens holder 2 is oriented in a clockwise position with respect to the Figure, and thereby the irradiation direction of the laser beam can be changed in the radial direction of the disc.

According to the lens position control unit of the optical pickup device of the present invention, the coil PCBs on which the focusing pattern, the tracking pattern, and the tilt pattern are formed are attached to on the front and rear surfaces of the lens holder, and the first and second magnets are installed at the positions facing the coil PCBs to perform the focusing, tracking, and radial tilt driving of the lens, and thereby, the entire size of the device and the weight can be reduced greatly to realize the miniaturization of the device. More preferably, when the coil PCB is fabricated using a flexible PCB, the weight can be reduced greatly and the responding function of the lens control unit can be improved.

Also, the coil is patterned on the PCB, and therefore, the fabrication processes can be reduced and assembling processes can be simplified.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A lens position control unit comprising:
   a lens holder, on which a lens is fixed, disposed on an upper part of a suspended yoke plate;
   suspension wires for supporting the suspension of the lens holder and applying electric power;
   coil PCBs, on which coils for focusing, tracking, and radial tilt driving of the lens holder are patterned, attached on front and rear parts of the lens holder; and
   magnets positioned at predetermined intervals from the coil PCBs to drive the lens by interaction with the coil PCBs;
   wherein the coil PCBs comprise a focusing pattern for focusing/driving the lens holder, a tracking pattern for tracking/driving the lens holder and a tilt pattern for tilt/driving the lens holder in a radial direction; and
   wherein the tracking pattern and the tilt pattern are formed to be overlapped with each other at right angles, the tracking pattern is protruded toward the center part of the coil PCBs, and the tilt pattern is formed to be protruded in an up-and-down direction of the coil PCBs centering around the overlapped portion of both the tracking pattern and the tilt pattern.

2. The unit of claim 1, wherein the lens holder includes a lens on a center part thereof, mounting members on which the suspension wires are fixed on both side surfaces thereof, and a PCB for connecting electric power which connects the suspension wires and the coil PCBs electrically.

3. The unit of claim 2, wherein the PCB for connecting electric power, to which the suspension wires are connected, is respectively attached to left and right side surfaces of the lens holder, and include electric power connecting patterns which are connected to the coil PCBs on front and rear parts electrically.

4. The unit of claim 3, wherein three suspension wires are respectively connected to the PCBs for connecting electric power.

5. The unit of claim 1, wherein the focusing pattern is formed on a center part of the coil PCBs to have a longer width in the up-and-down direction.

6. The unit of claim 1, wherein the tracking patterns are formed on four corners of the coil PCBs to have a longer width in a side direction of the coil PCBs respectively.

7. The unit of claim 1, wherein a pair of tilt patterns are disposed on the edge of the coil PCBs to face each other in a diagonal direction and to have longer widths in an up-and-down direction of the coil PCBs.

8. The unit of claim 1, wherein the magnets are fixed on the inside of an outer core of the yoke plate, and comprise a first magnet disposed to face the focusing pattern and the tracking pattern so as to interact with them and a second magnet disposed to face the tilt pattern so as to interact with the tilt pattern.

9. The unit of claim 8, wherein the first magnet is disposed to have a predetermined width so as to face the protruded part of the tracking pattern whereby a magnetic force can reach the focusing pattern and the tracking pattern, and disposed to form a north pole and a south pole in an up-and-down direction of the coil PCBs.

10. The unit of claim 8, wherein the second magnet is disposed to cross with the first magnet so as to face each other with the tilt pattern, and to have the north pole and south pole in a left and right direction of the coil PCBs.

11. A lens position control unit of an optical pickup device comprising:
    a lens holder, on which a lens is fixed, disposed on an upper part of a suspended yoke plate;
    suspension wires for supporting the suspension of the lens holder and applying electric power;
    coil PCBs, on which coils for focusing, tracking and radial tilt driving of the lens holder are patterned, attached on front and rear parts of the lens holder; and
    a first magnet positioned at a predetermined interval from the coil PCBs to drive the lens by an interaction with the coil PCB;
    wherein the coil PCBs comprise a focusing pattern for focusing/driving the lens holder, a tracking pattern for tracking/driving the lens holder and a tilt pattern for tilt/driving the lens holder in a radial direction; and
    wherein the tracking pattern and the tilt pattern are formed to be overlapped with each other at right angles, the tracking pattern is protruded toward the center part of the coil PCBs, and the tilt pattern is formed to be protruded in an up-and-down direction of the coil PCBs centering around the overlapped portion of both the tracking pattern and the tilt pattern.

12. The unit of claim 11, wherein the focusing pattern is formed on a center part of the coil PCBs to have a longer width in the up-and-down direction.

13. The unit of claim 11, wherein the tracking patterns are formed on four corners of the coil PCBs to have a longer width in the side direction of the coil PCBs.

14. The unit of claim 11, wherein the first magnet is attached on an inner surface of an outer yoke in the yoke plate, and disposed to have north and south poles in the up-and-down direction of the coil PCBs.

15. A lens position control unit of an optical pickup device comprising:
    a lens holder, on which a lens is fixed, disposed on an upper part of a suspended yoke plate;
    suspension wires for supporting the suspension of the lens holder and applying electric power;
    coil PCBs, on which coils for focusing, tracking, and radial tilt driving of the lens holder are patterned, attached on front and rear parts of the lens holder and moving with the lens holder integrally;
    an electric power PCB attached on a side surface of the lens holder to be connected with the suspension wires electrically, and includes connecting points which are connected to the patterns for focusing, tracking, and radial tilt driving formed on the coil PCBs; and
    magnets fixed on the yoke plate and positioned with a predetermined interval from the coil PCBs for driving the lens holder by interaction with the coil PCBs;
    wherein the coil PCBs comprise a focusing pattern for focusing/driving the lens holder, a tracking pattern for tracking/driving the lens holder and a tilt pattern for tilt/driving the lens holder in a radial direction; and
    wherein the tracking pattern and the tilt pattern are formed to be overlapped with each other at right angles, the tracking pattern is protruded toward the center part of the coil PCBs, and the tilt pattern is formed to be protruded in an up-and-down direction of the coil PCBs centering around the overlapped portion of both the tracking pattern and the tilt pattern.

* * * * *